(12) United States Patent
Harkcom et al.

(10) Patent No.: US 6,273,449 B1
(45) Date of Patent: Aug. 14, 2001

(54) TONGUE LATCH MECHANISM

(75) Inventors: Melanie W. Harkcom; Steven J. Campbell, both of New Holland; Thomas L. Stiefvater, Ephrata; Terry A. Young, Lititz, all of PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/606,165

(22) Filed: Jun. 29, 2000

(51) Int. Cl.$^7$ ................................................. B60D 1/155
(52) U.S. Cl. ...................... 280/491.3; 280/463; 56/14.9
(58) Field of Search ............................ 280/491.1, 491.3, 280/462, 463, 472, 473, 474; 56/14.9, 15.1, 15.2

(56) References Cited

U.S. PATENT DOCUMENTS

| | | | |
|---|---|---|---|
| 3,635,494 | * 1/1972 | Barkstrom et al. | 280/462 |
| 3,721,461 | 3/1973 | Nelson et al. | 280/415 B |
| 3,952,895 | * 4/1976 | Campbell | 280/463 |
| 4,381,118 | * 4/1983 | Weeks | 280/412 |
| 4,418,518 | * 12/1983 | Koch et al. | 56/228 |
| 4,508,359 | * 4/1985 | Campbell et al. | 280/463 |
| 4,558,560 | 12/1985 | Koch | 56/228 |
| 4,607,996 | 8/1986 | Koch | 414/537 |
| 4,662,646 | * 5/1987 | Schlapman et al. | 280/462 |
| 5,642,607 | 7/1997 | Stephenson et al. | 56/15.1 |

* cited by examiner

*Primary Examiner*—Kevin Hurley
(74) *Attorney, Agent, or Firm*—J. William Stader; Larry W. Miller

(57) ABSTRACT

The device consists of a two stage hydraulic tongue swing mechanism and a tongue latch mechanism for controlling and affixing the tongue of a pull type implement while the implement is being laterally transported. The two stage hydraulic tongue swing mechanism comprises a tongue plate attached to the tongue. A free plate is pivotally attached at the tongue pivot and is controlled by a hydraulic cylinder. The tongue plate and free plate are selectively attached to each other by a lateral transport latch. The tongue latch mechanism is partly affixed to the tongue and partly to the trailframe. Attached to the tongue is a tongue handle that controls the position of a tongue pin. The tongue pin is biased into an angled strike plate with a slot on the edge of the trailframe. The tongue pin may be held in a retracted position by a notched lock bar.

9 Claims, 8 Drawing Sheets

TONGUE LATCH MECHANISM

BACKGROUND OF INVENTION

1. Field of Art

This invention relates to the improvement of an agricultural harvesting machine. More specifically it relates to an improvement to the mechanism for rotating and affixing the tongue relative to the trailframe on a pull type agricultural implement.

2. Description of Prior Art

Pull type mowers and mower conditioners have been used in farming operations for decades. The mower is designed to cut and process hay or other crops. If desired, the processed crop can be placed in a windrow for drying and later processing. Typically, the mower or mower-conditioner is towed and powered by a tractor. The mower has a cutting means that is powered by the power-take-off shaft of the tractor. The cutting means can consist of a sickle bar or rotary disc mower. Such cutting means are well known and well described in the prior art. If desired, the cut crop can be conditioned or ejected from the mower. The stem portion of a conditioned crop is usually crimped so as to allow the moisture in the stem to escaped. If conditioned crops are desired, the crops are passed through a pair a rubber covered conditioning rolls or through a set of metal flails. The ejected crop is arranged onto a windrow to aid in drying. These methods are well known and described in the prior art. The processed crop is left on the field for future processing—usually a baling mechanism of some type.

As previously indicated the mower and conditioning rolls are powered by the PTO and/or a hydraulic pump on the tractor. Connecting the tractor to the mower or implement is a pivoting tongue. The tongue may be positioned so as to allow the implement to remain directly behind the tractor or to the left or right side of the tractor. Previously, the width of the mower was small enough to allow an operator to tow the implement directly behind the tractor (the standard transportation mode) without any difficulties. However, to improve efficiencies, the cutting means continues to be increased in width. The cutting means on many implements are now too wide to safely transport down a roadway using the standard transportation mode.

To assist in the transport of these large mowers and implements, the implement is backed onto a transporter or trailer and the tongue is pivoted 90 degrees from the standard transport position. This lateral transport positioning of the tongue allows the implement to be safely towed down a roadway. A hydraulic cylinder attached between the implement's trailframe and tongue accomplishes the pivoting of the tongue 90 degrees from the standard transport position to the lateral transport position. The hydraulic cylinder is actually rotating the entire implement and trailer relative to the tongue. As the hydraulic cylinder is retracted, a significant hydraulic force is required to rotate the implement and trailer. Typically, there is very little mechanical advantage left at the end of the cylinder stroke by the time the implement has rotated towards 90 degrees. As a result, it is difficult for the hydraulic cylinder to shift the implement the final few degrees or to begin to shift the implement the other direction when needed.

After the implement is rotated into the lateral transport position, the implement needs to be secured to the tongue. Prior art attachment mechanisms have been complicated and difficult to attach.

The prior art illustrates these and other difficulties with current art. U.S. Pat. Nos. 3,721,461 and 4,607,996 illustrate lateral transport trailers such as discussed above. As noted, the hydraulic cylinder used to rotate the implement 90 degrees relative to the tongue required a high force due to the poor mechanical advantage. U.S. Pat. Nos. 4,558,560 and 5,642,607 disclose conventional tongue and implement rotation approaches. As can be seen, the hydraulic cylinder has very little mechanical advantage when the tongue is in the lateral transport position.

Consequently, the need exists for an improved mechanism for swinging the tongue into the lateral transport position and for affixing the tongue to the trailframe to allow for safe transport of a wide mower or similar pull type implement.

OBJECTS OF THE INVENTION

It is an object of the present invention to provide an improvement to the mechanism to position a tongue and implement trailframe into a lateral transport position.

It is a further object of the present invention to provide a mechanism to secure the tongue safely to the trailframe.

It is a further object of the present invention to provide mechanism that allows for the tongue to be positioned in the lateral transport position without impacting the standard transport and field operating positions of the implement.

It is a further object of the present invention to provide a method for moving the tongue and implement into the lateral transport position from a standard operating position.

It is a further object of the present invention to provide a method of affixing the tongue to the implement's trailframe while in the lateral transport position.

It is a further object of the present invention to provide a method of releasing the tongue from the trailframe in order to move from the lateral transport position to standard operating positions.

It is a further object of the present invention to provide a mechanism that allows the implement to be rotated relative to the trailframe using the standard hydraulic cylinder provided for standard operating positions.

It is a further object of the present invention to provide a mechanism that is simple to use to affix the tongue to the trailframe.

It is a further object of the present invention to provide latching mechanism to selectively affix the hydraulic cylinder to the tongue.

SUMMARY OF THE INVENTION

The invention overcomes the deficiencies of the prior art. The invention is an improvement to the tongue on a pull type agricultural implement. The invention consists of a two stage tongue swing mechanism and a tongue latch mechanism which permits the easy and safe positioning of a tongue in the lateral transport position of the implement. The two-stage tongue swing mechanism consists of a tongue plate affixed to the tongue. A free plate is positioned beneath the tongue plate and rotates about the tongue pivot. The hydraulic cylinder is attached between the trailframe and the free plate. Extending or contracting the cylinder rotates the free plate about the tongue pivot. A lateral transport latch attached to the tongue plate can selectively secure the tongue and tongue plate to the free plate. The function of the standard transport latch is not interfered with because of an arcuate slot in the free plate.

The tongue latch mechanism is mounted on the tongue and engages with a bracket mounted on the edge of the trailframe. A tongue handle controls the movement of a tongue pin positioned on the tongue. Also controlling the tongue handle is a notched lock bar. Attached to the trailframe's edge is an angled strike plate for inserting the tongue pin when laterally transporting the implement.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
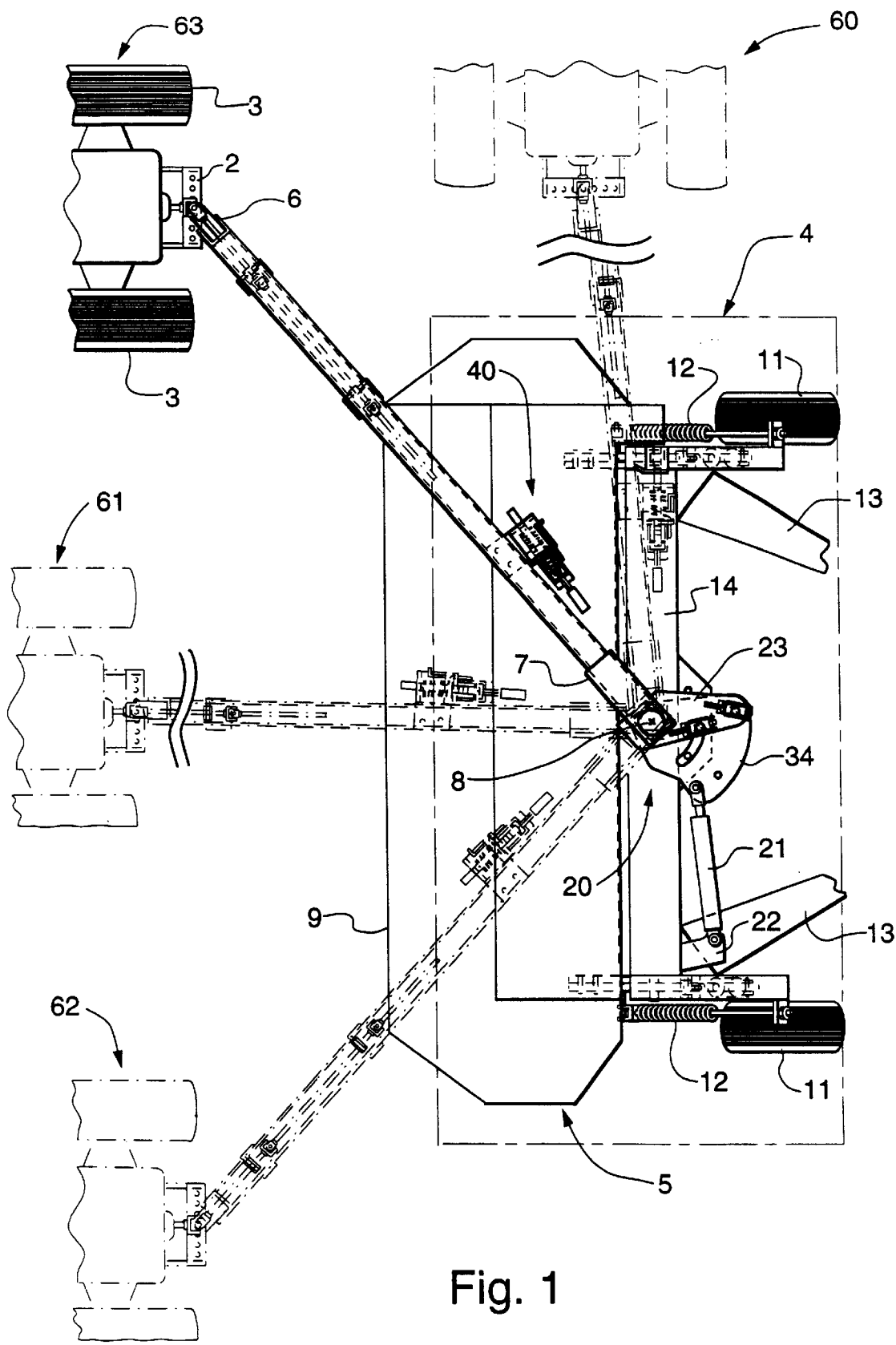
FIG. 1 is an overall plan view of the tractor and implement showing all the operating and towing relationships. The phantom line rectangle indicates the transporter or trailer used for lateral transport of the implement.

Referring to the drawings, it is possible to observe the major elements and general operation of the present invention. Left and right references are used as a matter of convenience and are determined by standing at the rear of the mower and facing the forward end in the normal direction of travel. Likewise, forward and rearward are determined by normal direction of travel of the tractor or implement. Upward or downward orientations are relative to the ground or operating surface. Horizontal or vertical planes are also relative to ground.

FIG. 1 illustrates a pull-type implement or mower 5 capable of being pulled by a tractor 1. The mower 5 has mowing or cutting elements 10. These elements can consist of a sickle bar or rotary disks that are well known in the art. The cutting elements 10 are covered by shielding 9. The shielding and cutting elements are attached to a trailframe 14. There are a pair of moveable windrow shields 13 which project the cut crop into a windrow. To help maintain the proper height of the cutting elements 10 while moving over uneven ground a pair of flotation springs 12 are used. A pair of implement tires 11 supports the entire implement 5. The implement 5 is pivotally connected to the tractor's hitch 2 between the rear wheels 3 by means of a tongue 7. The tongue 7 is pivotally attached at the trailframe 14 of the implement 5 at the tongue pivot 8. The tongue 7 pivots relative to the tractor 1 and implement 5 into a variety of positions as illustrated in FIG. 1. The center operating position or standard transport mode 61 shows the mower 5 positioned directly behind the tractor 1. The right side-operating mode 62 shows the mower 5 to the right side of the tractor 1. The left side-operating mode 63 is shown with the mower 5 to the left side of the tractor 1. Positioning the mower 5 in this manner is well known in the prior art. When it is necessary to transport the implement 5 down a roadway, the mower 5 is placed onto a transporter or trailer 4. The trailer 4 and implement 5 are rotated approximately 90 degrees so as to be oriented in the lateral transport position 60. The assembly may then be safely transported down the roadway.

Figure 2:
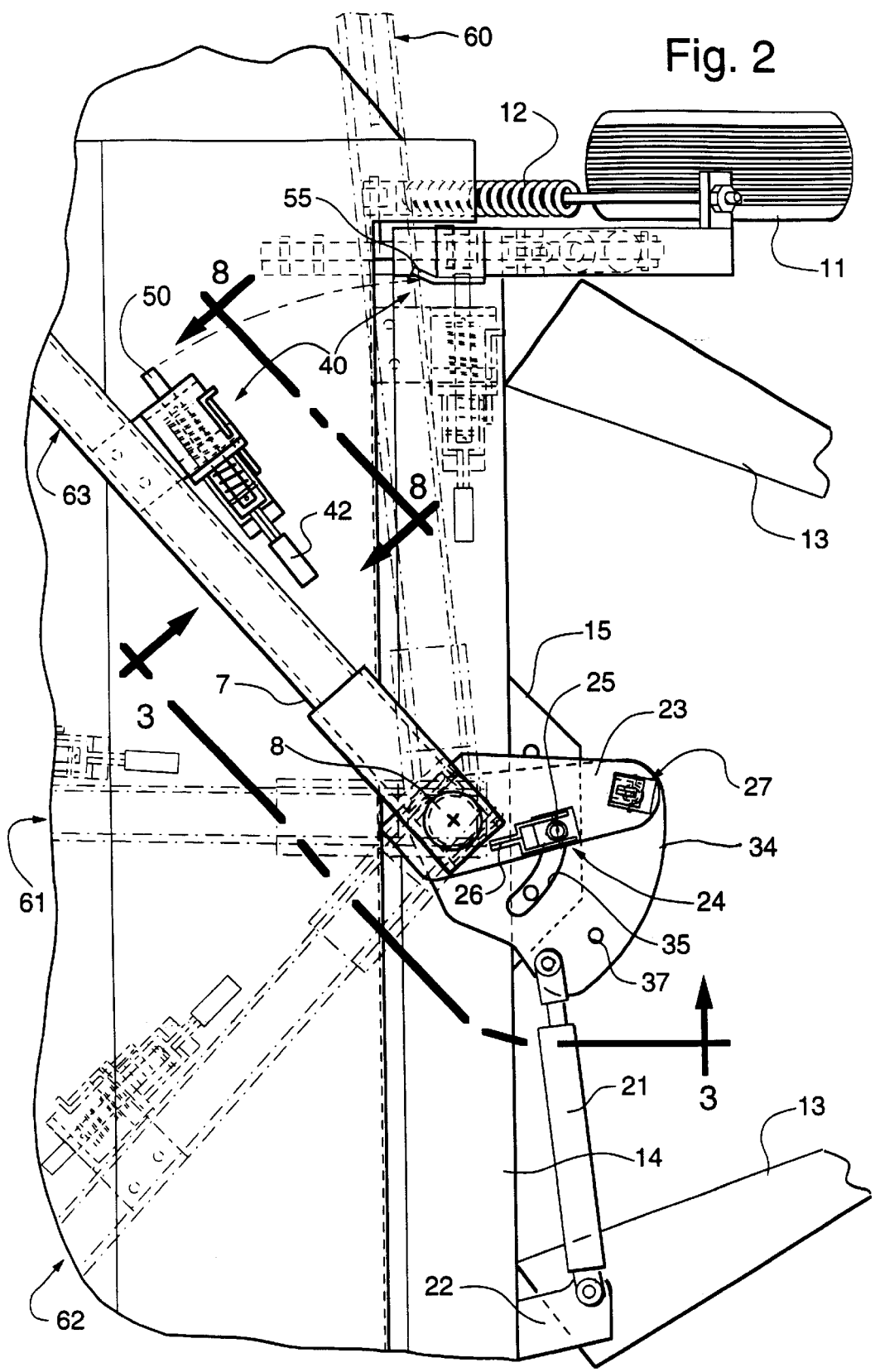
FIG. 2 is an enlargement of the tongue pivot of FIG. 1 to more clearly show the structure of the specific invention.

To help assist in the positioning of the tongue to the lateral transport position, the two stage hydraulic tongue swing mechanism 20 is used. The mechanism 20 can be seen in FIG. 2 and consists of a tongue plate 23 affixed to the tongue 7. Beneath the tongue plate 7 is located the free plate 34. The free plate 34 freely rotates about the tongue pivot 8. Attached to the free plate 34 is the hydraulic cylinder 21 that can rotate the free plate 34. The other end of the hydraulic cylinder 21 is attached to the trailframe 14 by means of a cylinder mount bracket 22. While a hydraulic cylinder 21 is used to rotate the free plate 34 in the preferred embodiment, other mechanism such as linear actuator could be used to rotate the free plate 34. The free plate 34 has two holes—the first pin hole 36 and second pin hole 37 that will be discussed later. The free plate 34 also has an arcuate slot 24 that will also be discussed later. Positioned beneath the free plate 34 is a standard transport bracket 15. This bracket 15 has the standard transport pin hole 16.

Figure 3:
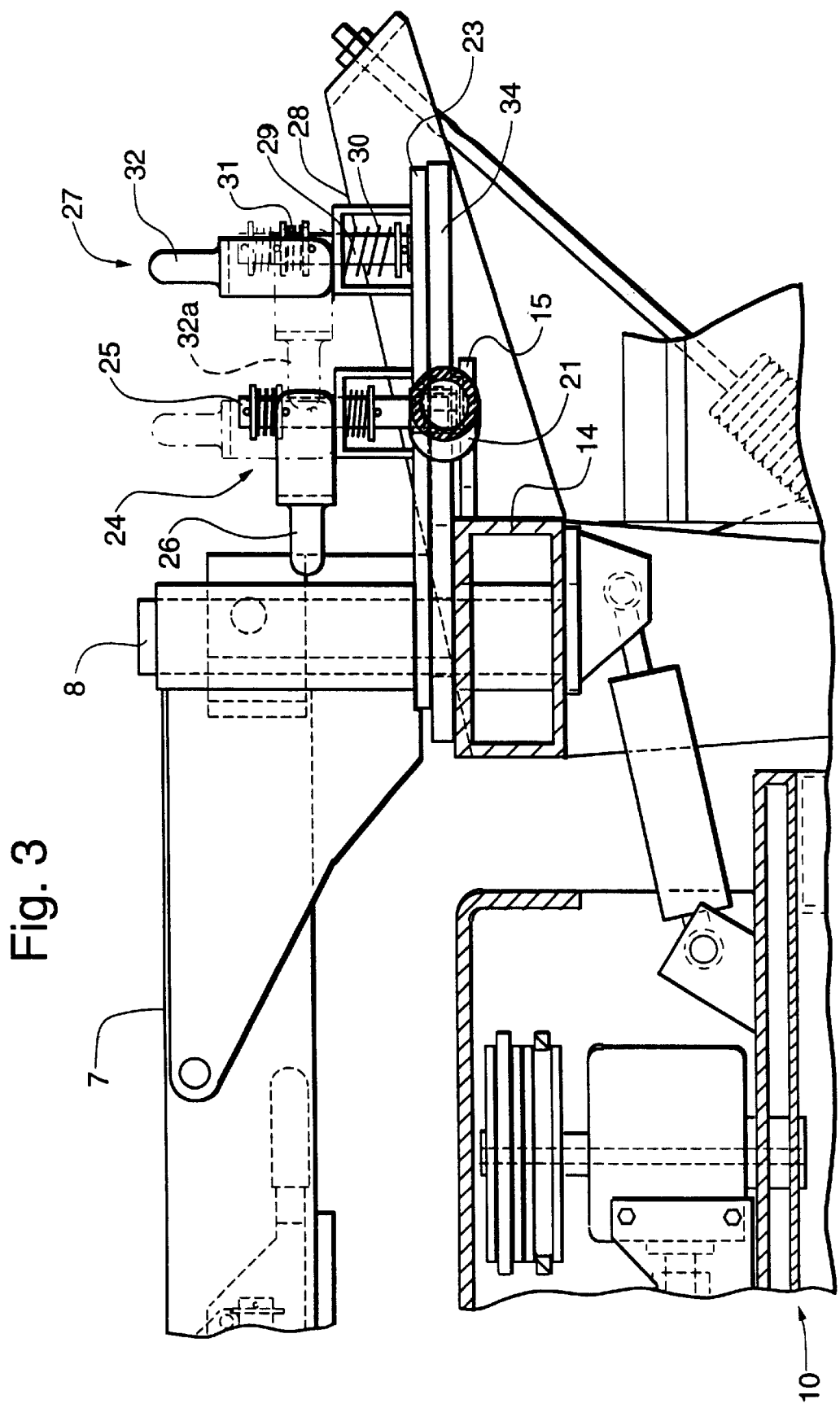
FIG. 3 is a vertical section taken on the irregular line 3—3 of FIG. 2 to view the structure of FIG. 2—2 from a 90 degree perspective of FIG. 2.

Affixed on the tongue plate 23 is the lateral transport latch 27 which affixes the tongue plate 23 to the free plate 34. Also affixed on the tongue plate 23 is the standard transport latch 24 which affixes the tongue plate 23 to the standard transport bracket 15. The latches shown use spring-biased pins, but other means of affixing the tongue plate 23 to the free plate 34 are possible. In the preferred embodiment, the standard latch 24 has a standard transport handle 26 that raises or lowers (as seen in FIG. 3) a standard transport pin 25. The transport pin 25 passes through the tongue plate standard transport hole 23a and then through slot 35 in the free plate and can be inserted into the standard transport bracket pin hole 16 in the standard transport bracket 15. This design allows the standard transport latch 24 to operate without interfering with the free plate 34.

The lateral transport latch 27 has a lateral transport frame 28 attached to the tongue plate 23. The frame 28 supports the lateral transport pin 29. The pin 29 is biased downwards by a pair of springs—the first lateral transport spring 30 and second lateral transport spring 31. A pivotally attached lateral transport handle 32 lowers the pin 29. Conversely, the pin 29 is raised when the handle 32 is rotated upwards as seen in 32. When the pin 29 is lowered, it passes through the tongue plate lateral transport hole 23b in the tongue plate 23 and then into either the first pin hole 36 or second pin hole 37 in the free plate.

Figure 5:
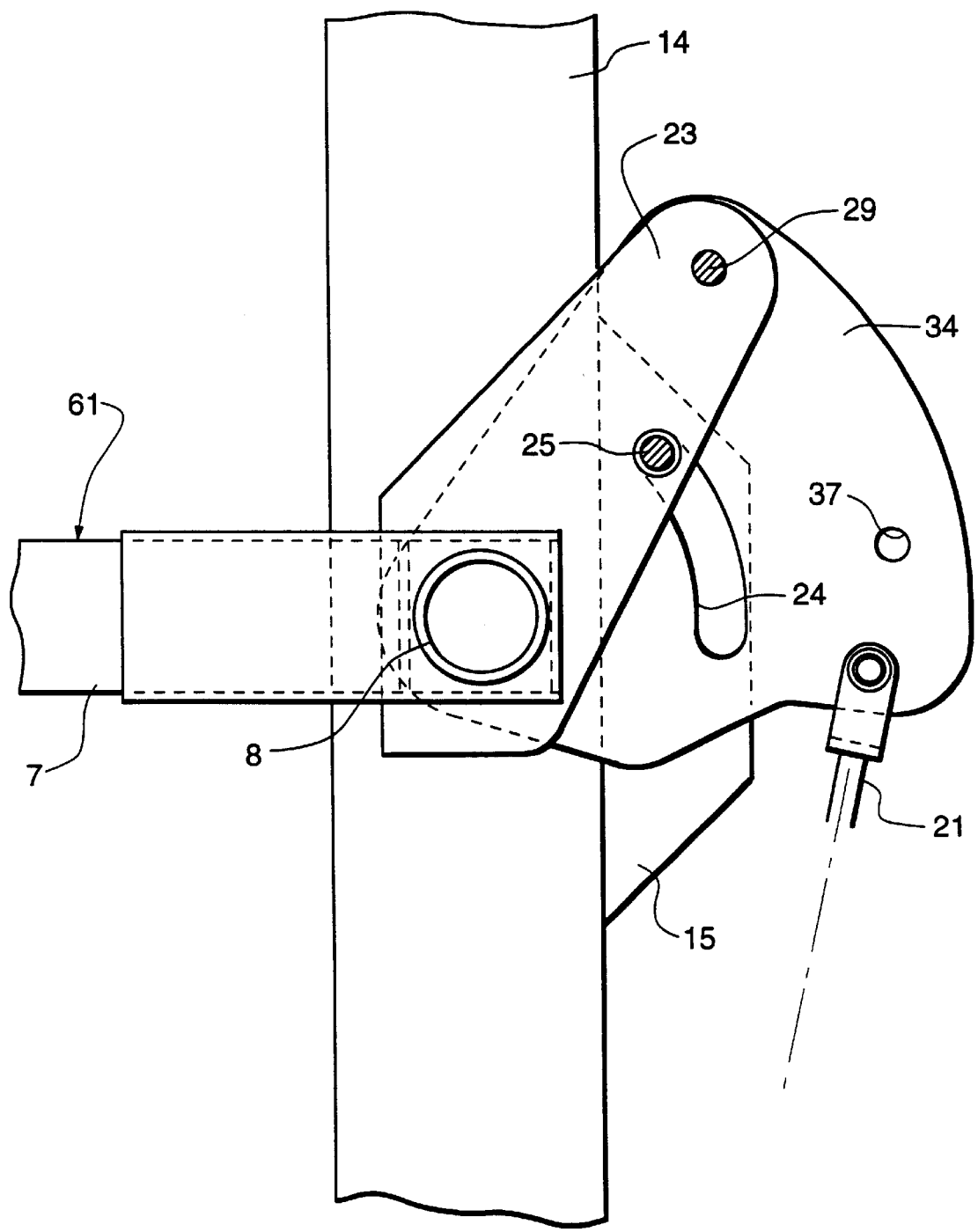
FIG. 5 is similar to FIG. 4 showing the key part in the forward or standard transport position.
Figure 6:
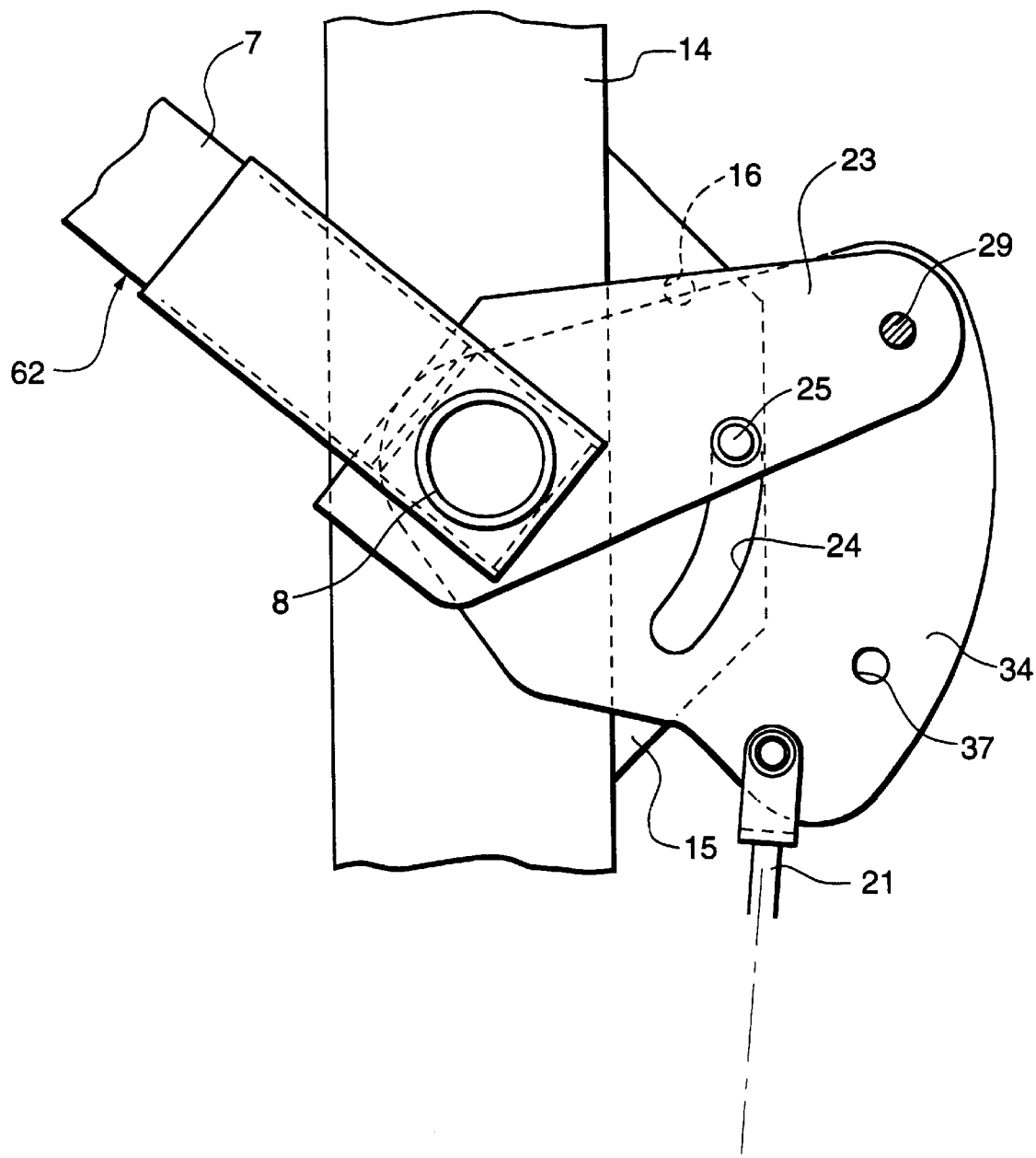
FIG. 6 shows the parts of FIG. 5 in the left, field operating position.
Figure 7:
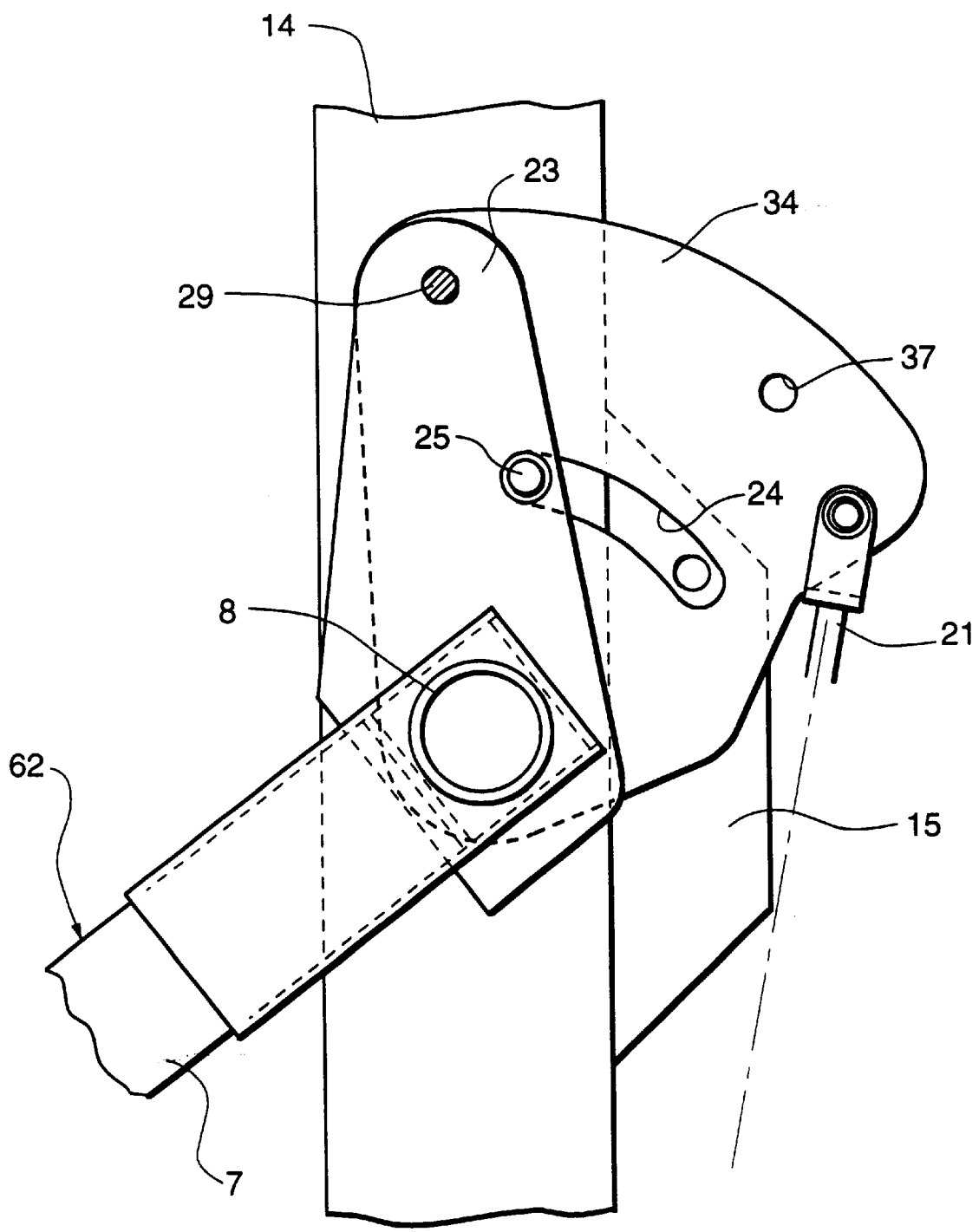
FIG. 7 is similar to FIG. 6, but showing the parts in the right field operating position.

During regular fanning operations, the tongue 7 can be positioned from side to side as illustrated in FIG. 1. Normally, the tongue 7 and tongue plate 23 are affixed to the free plate 34 by using the lateral transport latch 27 to insert the lateral transport pin 29 into the first pin hole 36 in the free plate. This allows the hydraulic cylinder 21 to rotate the tongue 7 relative to the implement 5 for conventional farming operations. If it is desired to secure the implement in a center position for the standard transport position 61 (as shown in FIG. 5), the standard transport latch 24 is used to insert the standard transport pin 25 into the standard transport bracket 15.

When it is desired to place the implement into the lateral transport mode 60, the implement is first backed up onto the transporter or trailer 4. Then the hydraulic cylinder 21 is retracted rotating the trailframe 14 and tongue 5 into closer alignment (as seen in FIG. 1). Then, the operator pulls a string 33 attached to the lateral transport handle 32 pulling the handle 32 upward. This lifts the lateral transport pin 29 out of contact with the free plate 34. The hydraulic cylinder 21 is now extended. This extension rotates only the free plate 34 and not the tongue plate 23 or tongue 7. As viewed in FIG. 1, the free plate 34 will now rotate in a counter-clockwise manner. Because the lateral transport pin 29 is biased in a downwards direction by the first and second lateral transport springs (30 and 31), the pin 29 will be reinserted into the second pin hole 37 of the free plate 34 when the plate 34 is sufficiently rotated. The driver, upon observing the insertion of the pin 29 into the second pin hole 37, will retract the hydraulic cylinder 21. This permits the tongue 7, tongue plate 23 and free plate 34 to continue to rotate in a clockwise fashion (as seen in FIG. 1). The process ends when the tongue 7 is aligned with the trailframe 14. Once the implement is safely transported, the removal process is very similar. Specifically, the hydraulic cylinder 21 is extended. Then the operator lifts the lateral transport pin 29 from the second pin hole 37. The hydraulic cylinder 21 is retracted, allowing the free plate 34 to freely rotate about the tongue pivot 23. The biased pin 29 is ultimately forced into the free plate's first pin hole 36. Then the cylinder 21 is extended again. This time the tongue plate 23, free plate 34 and tongue 7 rotate counter clock wise (as view in FIG. 1). This continues until the tongue 7 is approximately 90 degrees from the trailframe 14. The implement 4 may then be removed from the transporter or trailer 4 by the tractor 1 driving forwardly.

To safely secure the tongue 7 to the trailframe 14 while in the lateral transport mode 60, a tongue latch mechanism 40 is used. Part of the mechanism 40 is on the tongue 7 and part of the mechanism is on the right side of the trailframe 14 (as viewed from FIG. 1). The mechanism 40 consists of a tongue latch frame 41 attached to the tongue 7. A tongue handle 42 is pivotally attached to the frame 41 at the tongue handle pivot 44. The tongue handle 42 slidably controls a tongue pin 50. Normally, the tongue pin 50 is biased outwards (or towards the right when viewed in FIGS. 8 and 9) by the first tongue spring 51 and second tongue spring 52. The tongue pin 50 passes through the tongue slot 53 in the tongue frame 41. The tip of the tongue pin 50 has a bevelled area 54. Also controlling the tongue pin 50 is the lock bar 45. The lock bar 45 is pivotally attached to the tongue handle 42 and supported by a lock plate 47. The lock plate 47 is attached to the tongue latch frame 41. The lock plate 47 has a lock plate slot 48. The slot 48 is designed to receive the notch 46. As seen in FIG. 9, by depressing the lock bar 45, the tongue latch handle 42 is rotated counter clock wise. This shifts the tongue pin 50 towards the left as viewed in FIG. 9. The lock bar 45 locks the tongue pin 50 in a withdrawn position as seen in FIG. 9.

Figure 4:
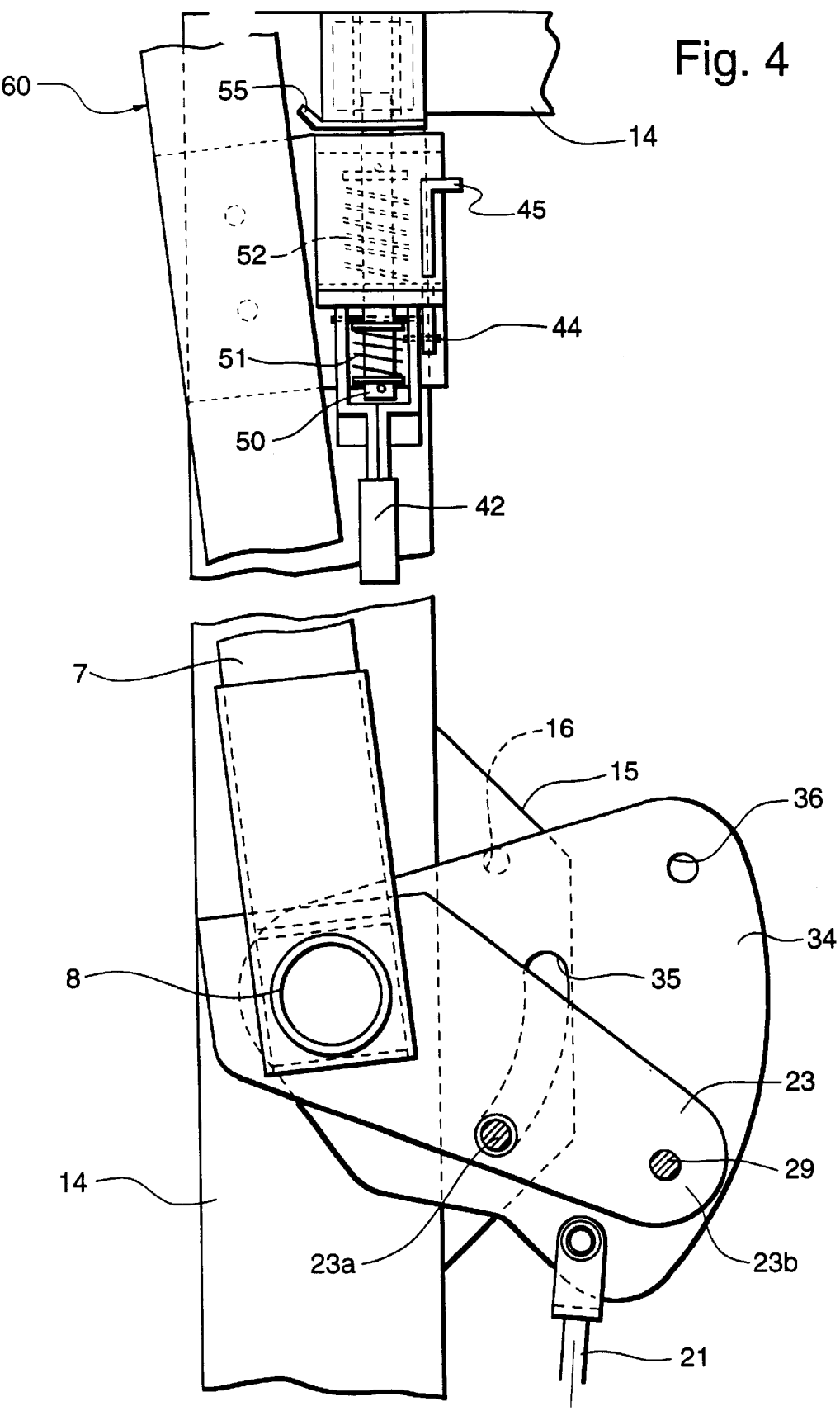
FIG. 4 is an enlarged schematic plan view of the key structure with the parts lateral transport position.

As seen in FIG. 4, attached to the trailframe 14 is an angle strike plate 55. The plate 55 has a tongue pin hole 56 for receiving the tongue pin 50 when the tongue 7 is positioned for lateral transport 60.

Figure 8:
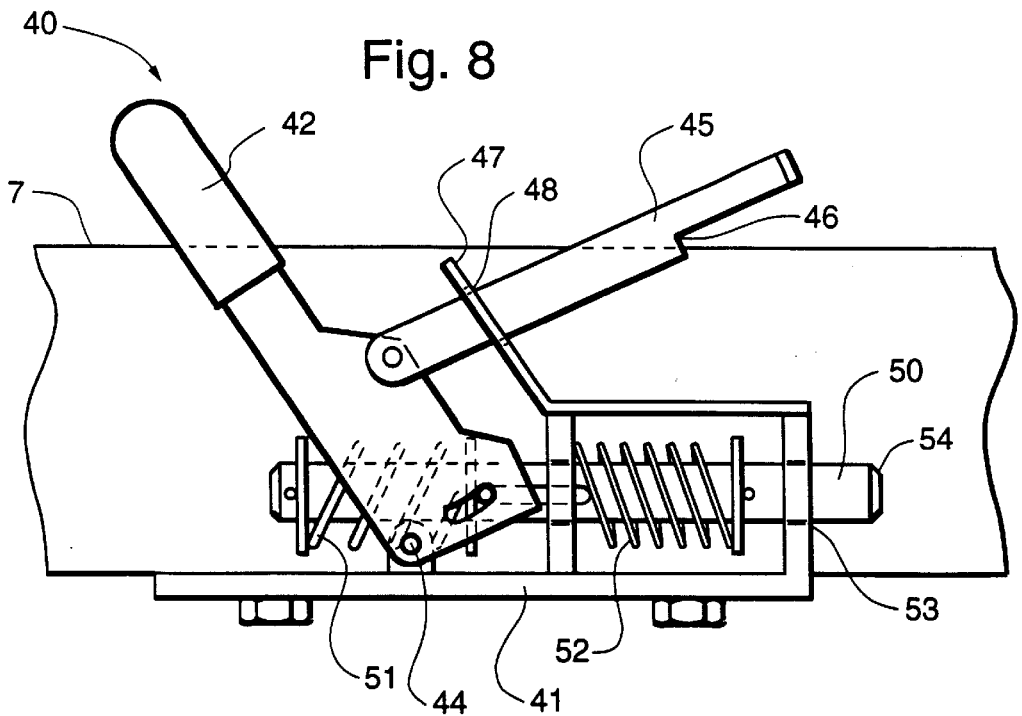
FIG. 8 is a detail view of the tongue latch mechanism as seen from the line 8—8 of FIG. 2.
Figure 9:
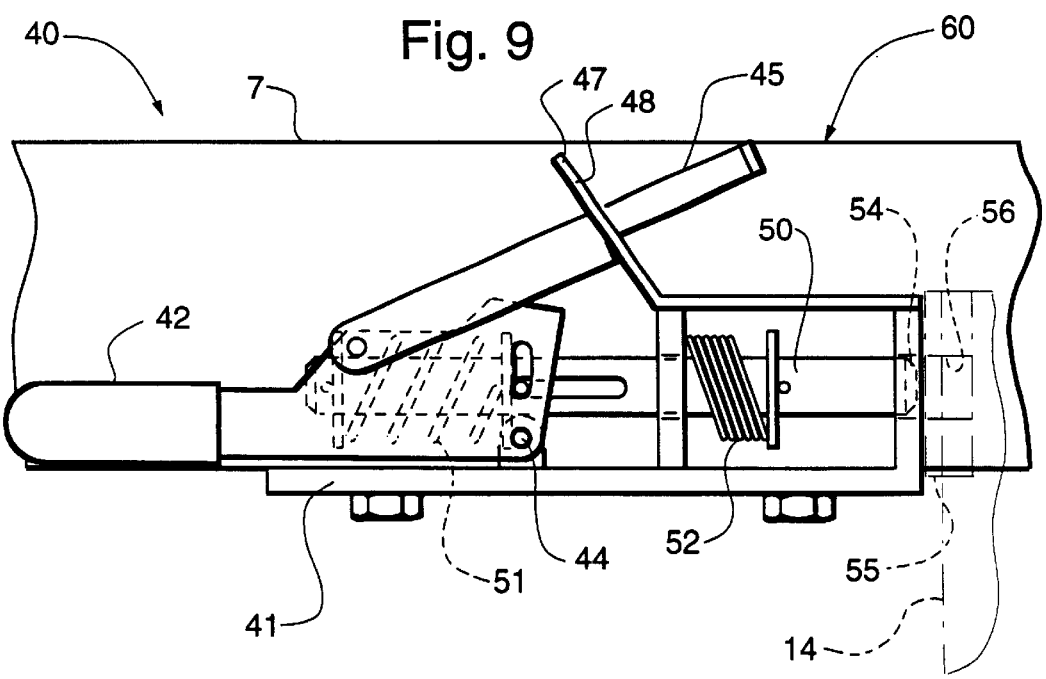
FIG. 9 show the tongue latch mechanism of FIG. 8 locked in the unlatched position.

In normal operations, the tongue handle 42, lock bar 45 and tongue pin 50 is positioned as seen in FIG. 8. When the tongue 7 and trailframe 14 are properly aligned for lateral transport 60, the bevelled area of the tongue pin 50 contacts the angled strike plate 55 and is inserted into the tongue pin hole 56 (as viewed in FIG. 4). After the implement 5 has been transported, the tongue pin 50 is retracted by rotating the handle 42 down and locked in place by depressing the lock bar 45 so as to allow the notch 46 to catch the lock plate 47 (as seen in FIG. 9). This action retracts the tongue pin 50 from the tongue pin hole 56. This permits the tongue 7 and trailframe S to rotate relative to each other. The operator releases the tongue pin 50 by lifting the lock bar 45. This positions the tongue pin 50 for later use.

It will be obvious to those skilled in the art that various changes may be made without departing from the scope of the invention and the invention is not to be considered limited to what is illustrated in the drawings and described in the specification

What is claimed is:

1. A tongue latch mechanism for a pull type implement comprising:
    a. a trailframe;
    b. a tongue pivotally attached to the trailframe, the tongue positioned in a lateral transport position; and
    c. a means for affixing the tongue to the trailframe, further comprising:
        i. a tongue latch frame affixed to the tongue:
        ii. a moveable tongue pin supported by the tongue latch frame: and
        iii. a tongue handle pivotally attached to the tongue latch frame, the tongue handle able to slidably move the tongue pin;
    d. a lock plate affixed to the tongue latch frame, the lock plate having lock plate slot, therein; and
    e. a lock bar pivotally attached to the tongue handle, the lock bar having a notch, therein, the notch selectively contacting the lock plate.

2. The tongue latch mechanism described in claim 1, further comprising an angled strike plate affixed to the trailframe, said strike plate having a tongue pin hole.

3. The tongue latch mechanism described in claim 2, wherein said tongue pin further comprises a bevelled region for contacting the angled strike plate.

4. The tongue latch mechanism described in claim 3, further comprising a first tongue spring and a second tongue spring for biasing the tongue pin into the tongue pin hole.

5. In an agricultural mower towed by a tractor comprising a tongue pivotally affixed to the tractor at a hitch, said mower having a trailframe supported by a pair of implement tires, said tongue pivotally attached to the trailframe by a tongue pivot, said mower capable of being placed on a trailer, the improvement comprising:

a. a tongue latch mechanism for selectively affixing the tongue, while in a lateral transport position, to the trailframe;
   b. the tongue latch mechanism further comprising:
      i. a tongue latch frame affixed to the tongue and supporting a tongue pin;
      ii. a tongue handle pivotally affixed to the tongue latch frame for slidably moving the tongue pin;
   c. an angle strike plate affixed to the trailframe, the strike plate having a tongue pin hole, therein, the tongue pin hole for receiving the tongue pin;
   d. a lock plate affixed to the tongue latch frame, the lock plate having a lock plate slot, therein; and
   e. a lock bar pivotally attached to the handle, the lock bar having a notch, therein, the notch having selective contact with the lock plate slot.

6. The improvement described in claim 5, wherein the tongue pin further comprises a bevelled area.

7. A method of detaching a tongue of a pull type agricultural implement while in a lateral transport position from a trailframe comprising the steps of:

a. removing a tongue pin from a tongue pin hole in a strike plate;
   b. sliding a notch in a lock bar into a lock plate slot; and
   c. rotating the trailframe relative to the tongue.

8. The method of claim 7, wherein the removing step further comprises the step of rotating a tongue handle that slidably controls the tongue pin.

9. The method of claim 8, wherein the step of rotating the tongue handle further comprises the step of inserting a notch in a lock bar into the a lock plate slot.

* * * * *